United States Patent
Rovik et al.

(10) Patent No.: US 9,589,464 B2
(45) Date of Patent: Mar. 7, 2017

(54) VEHICULAR HEADLIGHT WARNING SYSTEM

(71) Applicant: Toyota Motor Engineering & Manufacturing North America, Inc., Erlanger, KY (US)

(72) Inventors: Christopher L. Rovik, Northville, MI (US); Eric R. Schmidt, Northville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/719,407

(22) Filed: May 22, 2015

(65) Prior Publication Data

US 2016/0343254 A1    Nov. 24, 2016

(51) Int. Cl.
  *G08G 1/00*      (2006.01)
  *G08G 1/0965*    (2006.01)
  *B60Q 9/00*      (2006.01)
  *G01J 1/42*      (2006.01)
  *G01J 3/50*      (2006.01)

(52) U.S. Cl.
  CPC ............ *G08G 1/0965* (2013.01); *B60Q 9/00* (2013.01); *G01J 1/4204* (2013.01); *G01J 3/50* (2013.01)

(58) Field of Classification Search
  CPC . B60Q 1/26; B60Q 2300/42; B60Q 2300/314
  USPC ......... 340/902, 425.5, 468, 457.2, 471, 472, 340/469; 296/97.7; 701/49
  See application file for complete search history.

(56) References Cited

U.S. PATENT DOCUMENTS

| | | | | |
|---|---|---|---|---|
| 5,347,261 A | * | 9/1994 | Adell ...................... | B60Q 1/38 307/10.8 |
| 6,275,145 B1 | * | 8/2001 | Rogozinski .......... | B60Q 1/0023 296/97.7 |
| 6,403,942 B1 | | 6/2002 | Stam | |
| 7,005,977 B1 | | 2/2006 | Tengler et al. | |
| 8,946,990 B1 | * | 2/2015 | Gupta .................... | B60Q 1/143 250/208.2 |

FOREIGN PATENT DOCUMENTS

WO    2013021795 A1    2/2013

* cited by examiner

*Primary Examiner* — Toan N Pham
(74) *Attorney, Agent, or Firm* — Christopher G. Darrow; Darrow Mustafa PC

(57) ABSTRACT

A method is provided for alerting a driver of a vehicle of an unsafe exterior lighting status. The method includes receiving, at a first vehicle, information sufficient to detect a presence of a second vehicle. Once a vehicle is detected, the method continues to identify a direction of travel of the second vehicle with respect to the first vehicle. The method includes measuring a level of ambient light, and determining the level of ambient light is below a threshold level. The method further identifies any presence of functioning exterior lighting of the second vehicle by detecting a light color and light intensity. When an unsafe exterior lighting status is determined, the method includes alerting a driver of the second vehicle using a vehicle-to-vehicle communication signal. The signal includes a notification suggesting usage of at least one of headlights, parking lights, and hazard lights.

18 Claims, 2 Drawing Sheets

VEHICULAR HEADLIGHT WARNING SYSTEM

TECHNICAL FIELD

The present disclosure generally relates to a vehicle communications, and more particularly, to a system and method for providing alert communications between vehicles regarding headlight and other exterior lighting usage.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Vehicles and automobiles have been provided the option to have automatic exterior lighting controls for quite some time. Generally, an ambient light detection unit measures a level of ambient light and controls the on and off or delay off, operation. Of course, the automatic nature of the controls can be turned off and/or overridden. Alternatively, certain vehicles are not provided with automatic controls, and the exterior lighting is fully manually controlled.

In certain situations, safety reasons may dictate the use of high beam headlights. Although most drivers revert back to low beam headlights when an another oncoming vehicle is approaching, certain drivers may forget or otherwise fad to switch the operational status, which may affect visibility of other drivers. In other situations, a driver may forget to turn on the headlights or appropriate exterior lights altogether, and not have proper visibility. Still further, it may be difficult or impossible for other drivers to detect the presence of the other vehicle without operational exterior lights. Current methods of relying on a driver to quickly notice this situation and subsequently flash its high beam headlights at a vehicle, or sound a horn etc., may be an inadequate notification for alerting another driver of its unsafe exterior lighting operational status.

Accordingly, it would be desirable to provide an improved system and method for automatically alerting a vehicle driver of an unsafe exterior lighting operational status.

SUMMARY

This section provides a general summary of the disclosure, and is not a comprehensive disclosure of its full scope or all of its features.

In various aspects, the present teachings provide a method for alerting a vehicle driver of an exterior lighting operational status. The method includes detecting, at a first vehicle, a presence of a second vehicle. Once detected, the method includes measuring a level of ambient light, and determining the level of ambient light is below a threshold level. The method includes determining an operational status of exterior lighting of the second vehicle. When an unsafe exterior lighting status is determined, the method includes alerting a driver of the second vehicle using a vehicle-to-vehicle communication signal. The signal includes a notification related to the operational status of the exterior lighting of the second vehicle.

In other aspects, the present teachings provide a method for alerting a driver of a vehicle of an unsafe exterior lighting status. The method includes receiving and processing, at a first vehicle, information sufficient to detect a presence of a second vehicle. Once a vehicle is detected, the method continues to identify a direction of travel of the second vehicle with respect to the first vehicle. The method includes measuring a level of ambient light, and determining the level of ambient light is below a threshold level. The method further identifies any presence of functioning exterior lighting of the second vehicle by detecting a light color and light intensity. When an unsafe exterior lighting status is determined, the method includes alerting a driver of the second vehicle using a vehicle-to-vehicle communication signal. The signal includes a notification suggesting usage of at least one of headlights, parking lights, and hazard lights.

In still other aspects, the present teachings provide a non-transitory computer-readable medium having instructions embodied thereon that, when executed by a processor, perform operations in a first vehicle. The operations include detecting a presence of a second vehicle. Once detected, the operations include measuring a level of ambient light, and determining the level of ambient light is below a threshold level. The operations include determining an operational status of exterior lighting of the second vehicle. When an unsafe exterior lighting status is determined, the operations include alerting a driver of the second vehicle using a vehicle-to-vehicle communication signal. The signal includes a notification related to the operational status of the exterior lighting of the second vehicle.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
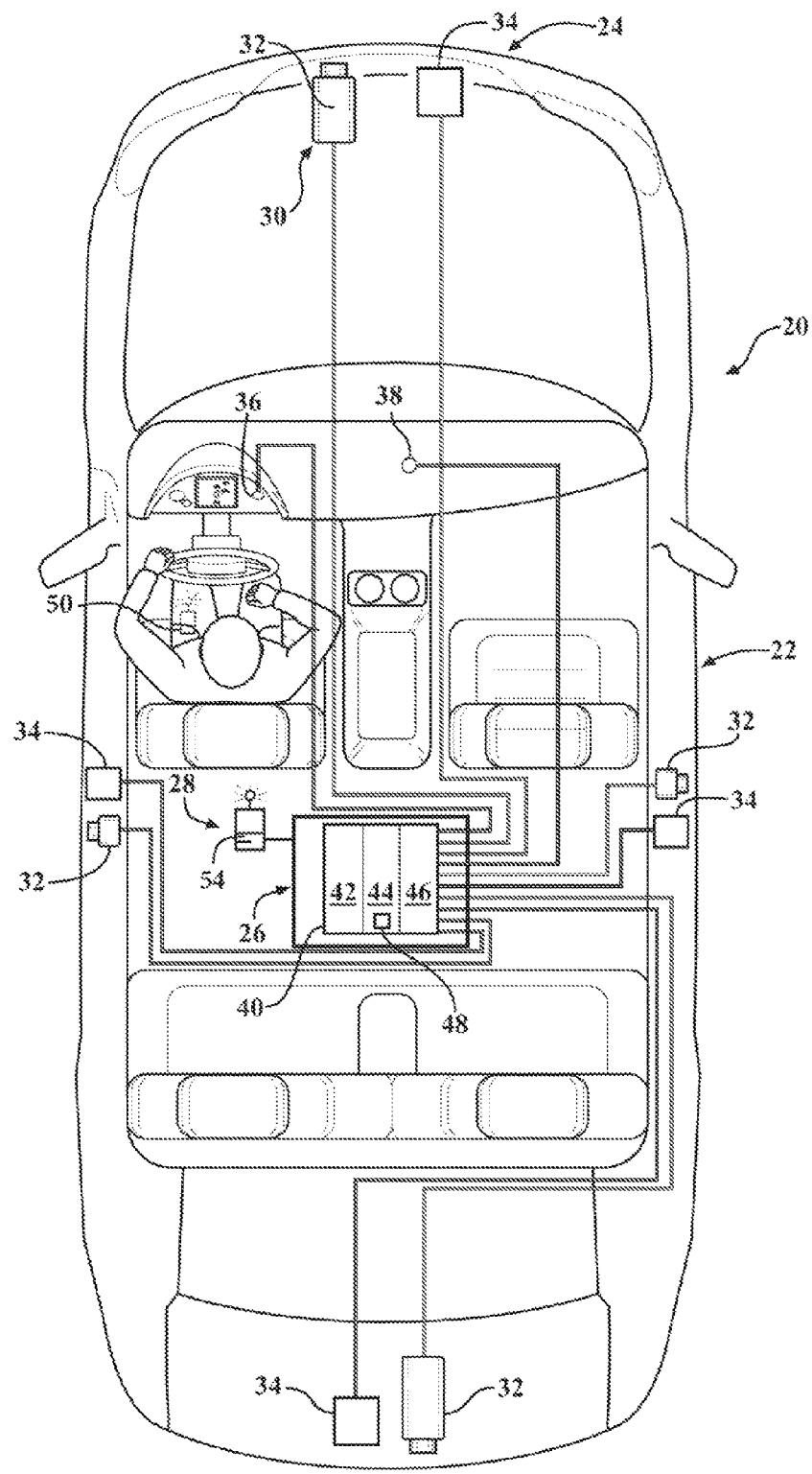
FIG. 1 is a schematic view of an exemplary vehicle for use according to various aspects of the present teachings.

It should be noted that the figures set forth herein are intended to exemplify the general characteristics of materials, methods, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and subheadings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The present technology generally concerns systems and methods for automatically alerting a vehicle driver of an unsafe exterior lighting status. According to various aspects, the present teachings detect when other vehicles on or near a roadway or intended travel path may be operating without proper/safe usage of exterior lighting, such as headlights, parking lights, and hazard lights. Once an unsafe condition is determined, systems and methods of the present technology may automatically notify other vehicles either visually or electronically so their operators can consider turning on appropriate exterior lighting for the driving conditions. In various aspects, this would also notify the driver or user of the detecting vehicle of the situation in order to increase awareness and mitigate any collision between the various different vehicles.

As used herein, the term "vehicle" should be construed having a broad meaning, and should include all types of vehicles, with non-limiting examples including a passenger or commercial automobile, car, truck, motorcycle, off-road vehicle, bus, boat, airplane, helicopter, lawn mower, recreational vehicle, amusement park vehicle, farm vehicle, construction vehicle, tram, golf cart, train, or trolley, etc. In various instances, vehicles useful with the present technology may be partially or fully autonomous vehicles.

FIG. 1 schematically illustrates an exemplary vehicle 20 provided with various detection systems, hardware, software, and capabilities useful with various aspects of the present teachings. The vehicle 20 may generally include a typical passenger compartment 22, and may be provided with one or more sensor systems 24, a control system 26, and a communication system 28. It should be understood that although the particular systems or subsystems may be separately defined, each or any of the systems may be otherwise modified, combined, or segregated via appropriate hardware and/or software as is known to those of ordinary skill in the art. Further, the location of certain systems disposed within the vehicle 20 are representative examples, and the specific location of each component may vary.

Generally, the sensor system 24 may include various sensors operable to identify conditions associated with the vehicle 20. In one aspect, the sensor system 24 may include one or a plurality of sensor arrays 30. By way of example, each sensor array 30 may include a first sensor system 32 generally configured to view and for collect data regarding the exterior surroundings of the vehicle 20 and/or to detect a rate of closure with respect to another vehicle or object. Each sensor array 30 may also include a second sensor system 34 generally configured to detect light measurements, as will be discussed in more detail below. As shown, different sensors 32, 34 may be directed to focus on a different location or area outside of the vehicle 20 (i.e., front, rear, left, and right) and may be configured to identify at least one condition around the vehicle 20.

In one example, the first sensor system 32 can provide imagery and/or position data related to another vehicle (or object) from each respective side of the vehicle 20 to the control system 26. It should be appreciated that although four sensors 32 are shown in FIG. 1, disposed around a perimeter of the vehicle 20, any number of sensors 32 may be suitable. The field of view of each sensor 32 may overlap to substantially provide a 360 degree view/monitoring of the vehicle 20 surroundings. In addition to the detection of a vehicle or object, the first sensor system 32 may also provide a rate of closure, ranging, closing velocity, identification, and/or other non-imagery data to the control system. Examples of suitable sensors 32 may include still cameras; video cameras; infrared, thermal, or other imaging sensors; ultrasonic wave sensors; RADAR; LIDAR; SONAR; distance measurement sensors; and combinations thereof.

The second sensor system 34 may generally include one or more light sensors used to detect ambient light levels, and may optionally provide additional light conditions information. For example, the light sensor 34 may be a non-imaging sensor configured to detect forward light sources, as well as the detection of ambient light. Similar to the first sensor system 32, it should be appreciated that although four sensors 34 are shown, any number of sensors may be suitable. Likewise, the field of view of each sensor of the second sensor system 34 may overlap to substantially provide a 360 degree monitoring of the vehicle 20 exterior surroundings. In various aspects, the optical system(s) of the second sensor 34 may include one or more optical filters configured to detect a color of each light source detected, as well as an angle of the light beam. In this regard, the sensor system 34 may work with the control module 40 to detect non-vehicle lighting, such as lighting from a street lamp, or storefront that should be ignored. The sensor system may also be able to detect differences in color and/or angles to differentiate between and identify the different types of exterior lighting, including daytime running, lights, parking lights, LED lights, high beam headlights, low beam headlights, hazard lights, brake lights, fog lights, etc.

In various aspects, a level of ambient light, or an equivalent measurement of the brightness of the vehicle exterior surroundings may be detected by one or more con-light sensors in communication with the control module 40. In one example, a con-light sensor 38 may be provided on or near a dashboard area of the vehicle interior. Such sensors are typically used in connection with controlling an illuminating state of an exterior lighting system of a vehicle, and may be controlled on the basis of an output from the con-light sensor 38.

The control system 26 may generally include a computing device, such as a control module 40 with at least one processor 42, a memory 44, and an interface 46. The control module 40 may be a portion of a central vehicle control, a stand-alone unit, or other system, including cloud based. Alternatively, the control module 40 can be composed of multiple computing devices. The processor 42 may be any type of conventional microprocessor having desired performance characteristics and capable of manipulating or processing data and other information. The memory 44 may include any type of computer readable medium that stores data and control algorithms 48 described in more detail below. Other operational software for the processor may also be stored in the memory 44. The interface may facilitate communication with other systems such as the sensor system 24, the communication system 28, and other on-board systems. On-board systems may include, but are not limited to, a vehicle head unit, vehicle diagnostic sensors, vehicle entertainment systems, vehicle automated controls, and the like.

The control module 40 can also include secondary, additional, or external storage, for example, a memory card, flash drive, or any other form of computer readable medium. Installed applications can be stored in whole or in part in the external storage and loaded into the memory 44 as needed for processing.

The control module 40 can also be in communication with one or more of the sensors and sensor systems 32, 34 disclosed herein. As noted above, the sensors may be disposed at various locations on the vehicle 20 to capture data and/or signals for processing by an inertial measurement unit (IMU), a lane-keeping assist (LKA) system, a dead-reckoning system, an adaptive cruise control (ACC) system, a global navigation satellite system (GNSS) or global positioning system (GPS), a light detection and ranging (LIDAR) system, a radar system, a sonar system, an image-based sensor system, simultaneous localization and mapping (SLAM), visual-SLAM (VSLAM), or any other type of system capable of capturing information specific to the environment surrounding a vehicle, including information specific to objects such as other vehicles proximate to the navigation route of the vehicle, pedestrians, features of the route being travelled by the vehicle, landmarks, or other localized position data and/or signals and outputting corresponding data and/or signals to a CPU.

The communication system 28 may provide visual notifications to an area 36 of the dashboard for notifications to a driver or user of the vehicle 20. In one example, a notification may include an alert of an upcoming vehicle that does not have proper exterior lighting in an operational mode. In another example, the communication system 28 may provide audible notifications to a driver, including, speech or tone alerts. The communication system 28 may also include an appropriate wireless communication system that is operable to communicate with other vehicles and drivers using known vehicle-to-vehicle or inter-vehicle communication systems. For example, wireless communication systems, such as telephony and Dedicated Short Range Communications (DSRC) can broadcast messages, notifications, or alerts between vehicles using a frequency between about 5-6 GHz.

In various aspects, messages can be sent between two or more vehicles using an appropriate communications standard, such as SAE J2735 Standards for DSRC, or equivalent, which may contain various vehicle information, including but not limited to, kinematic and location information, GPS position, velocity, vehicle dimensions, as well as operational status of exterior lighting, such as the on/off status of high beams, low beams, parking lights, hazard lights, etc. According to the teachings of the present disclosure, the messages could be modified to notify a vehicle driver, user, or operator of various settings, as well as notifications, alerts, and warnings from other vehicles that suggest various usage of the exterior lighting system where appropriate.

The communication system 28 may also communicate with a personal electronic device 50 such as a smart phone, tablet, or other wearable device, such as a smart watch, smart glasses, or other device. In various aspects, the communication system also includes a positional system 54, such as a GPS device, to determine the location of the vehicle 20.

Figure 2:
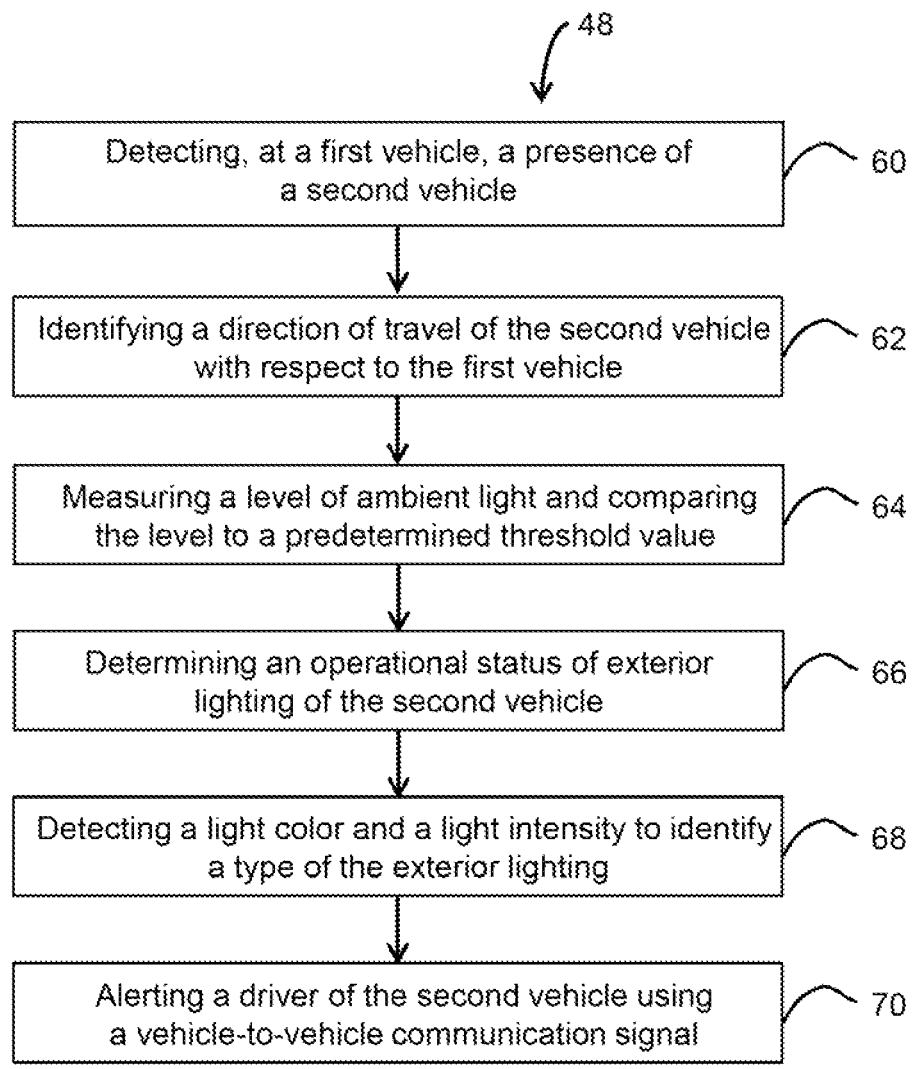
FIG. 2 is a flow chart of an exemplary control process algorithm useful with the present teachings.

With reference to FIG. 2, one non-limiting algorithm 48 for alerting a vehicle driver of an exterior lighting operational status is schematically illustrated. The functions, methods, and steps are disclosed in terms of block diagrams, however, it should be understood that these functions may be enacted or performed in dedicated hardware circuitry or programmed software routines as a computer readable storage medium capable of execution as instructions in a microprocessor based electronics control embodiment, such as the control system 26. In other words, the memory 44 is one example of a non-transitory computer-readable medium/storage media having embodied thereon computer-useable instructions such as the algorithms that, when executed, performs a method 100 for alerting as vehicle driver of an exterior lighting operational status.

In various non-limiting aspects, the present technology includes detecting a presence of a second vehicle as depicted by step 60. This may include receiving and processing, at a first vehicle, various information sufficient to detect a presence of a second vehicle. For example, data and other information can be obtained from the first sensor system 32 and processed by the control module 40. In certain aspects, a moving vehicle may need to be distinguished from other objects, such as pedestrians, parked vehicles, etc.

Once the second vehicle is detected, the method continues to identify a direction and/or speed of travel of the second vehicle with respect to the first vehicle as depicted by step 62. In various aspects, the direction of travel may generally be toward the first vehicle, away from the first vehicle, or it may be determined that the second vehicle or object is stationary.

The method may include measuring a level of ambient light, and comparing the level of ambient light to a predetermined value as depicted by step 64. In one non-limiting example, a level of ambient light can be detected from a con-light sensor 38 of a vehicle as described above. The method further includes determining whether the measured level of ambient light is below a predetermined threshold level. For example, a determination is made whether or not the level of ambient light is low enough that exterior lighting should be in an operational mode for visibility and/or safety concerns. In certain driving conditions, the level of ambient light may vary rapidly with travel under bridges or overpasses, or through tunnels of various length. Thus, it may be desirable to compare the level of ambient light to the predetermined value more than one time in a designated time period before making a determination that exterior lighting should be used.

Once it is determined that exterior lighting should be used, the method may further include determining an operational status of exterior lighting of the second vehicle as depicted by step 66. In various aspects, the method may include identifying any presence of functioning exterior lighting of the second vehicle using the various sensors from the first and second set of sensor systems 32, 34 and/or additional image or light sensors. Where appropriate, the methods may also include detecting a light color and light intensity in order to identify a specific type of the exterior lighting, as depicted by step 68. As should be understood, headlight and taillight brightness is greatest directly in front of the lamps, and may decrease rapidly as the off-center angle (relative to a line projecting straight out directly in front of the lamp) increases. As such, a distance between vehicles may be needed to complete such an analysis. It is envisioned that in certain aspects, the methods may be able to detect and differentiate a distinction between daytime running lights, parking lights, LED lights, high beam headlights, low beam headlights, flashing hazard lights, fog lights, and brake lights.

The methods of the present teachings may include evaluations of the exterior lighting status of one or more vehicles. When a determination is made that the level of ambient light is below a predetermined threshold, indicating exterior vehicle lighting should be used, and a determination is made that a detected vehicle does not have exterior lighting in an operational mode, algorithms of the present teachings may make a determination that a vehicle is operating with an unsafe exterior lighting status. When an unsafe exterior lighting status is determined, the method may include alerting a driver of the second vehicle using an electronic vehicle-to-vehicle communication signal as depicted by step 70. The signal may include a message or notification related to the operational status of the exterior lighting of the second vehicle. Specifically, the signal may include a notification suggesting usage of at least one of headlights, parking lights, and hazard lights, depending on the different circumstances. Visual notifications, such as a flashing of one or more lights of the first vehicle may also be used in addition to, or in place of the electronic vehicle-to-vehicle communication signal.

In one example, where a second vehicle is determined to be an oncoming vehicle moving in a direction towards the first vehicle, and the headlights are not operating or are operating in a high beam mode, the signal may include a notification suggesting usage of headlights operated in a low beam mode. In instances where a high beam mode is detected, the method may additionally include providing a second or follow-up signal. For example, upon the first vehicle ultimately passing by the second vehicle, or the two vehicles being in relative positions where high beam usage would no longer impact visibility for the first vehicle, the method may further include sending a follow-up vehicle-to-vehicle communication signal to the second vehicle. The follow-up signal may include a notification suggesting that usage of the headlights can safely revert back to the high beam mode.

In still other aspects, where a second vehicle is determined to be an oncoming vehicle moving in a direction towards the first vehicle, and a determination is made that only parking lights or daytime running lights are operating, the signal may include a notification suggesting usage of headlights, preferably operated in a low beam mode.

In various aspects, it may be determined that the second vehicle is a stationary or disabled vehicle, for example, a vehicle with mechanical problems temporarily located on the side of a roadway. In such an example, where the algorithm involves determining the second vehicle is parked or temporarily standing adjacent an intended travel path of the first vehicle, and a review of the operational status of the exterior lighting results in a determination that the exterior lighting is off, the signal sent to the second vehicle may include a notification suggesting usage of parking lights or hazard lights. In this situation, the methods may also include alerting a driver or operator of the detecting (first) vehicle to the presence and location of the second vehicle. Such a notification may be sent through the communication system 28, and/or may be a visual notification, such as a blinking light or textual display, in an area 36 of the dashboard as described above. In other aspects, the notification may be audible, or a combination of audible and visual alerts. Still further, the signal may include a communication to the second vehicle inquiring as to whether emergency assistance may be needed. In the event that additional vehicles are also determined to be nearby, the methods may also include sending the additional vehicles a notification regarding the presence of the stationary or disabled vehicle.

In certain aspects, the methods of the present disclosure may additionally monitor for environmental conditions, such as the presence of precipitation, which may be present as rain, snow, ice, slush, fog, etc., and that may impair visibility such that certain exterior lighting should be in an operational mode. Thus, in various aspects, when a presence of precipitation is detected, and a determination has been made that the operational status of the exterior lighting of the second vehicle results in a determination that headlights are not operating, an electronic signal can be sent to the second vehicle that includes a notification suggesting usage of headlights operated in a low beam mode, and/or the use of fog lights.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method for alerting a vehicle driver of an exterior lighting operational status, the method comprising:
   detecting, at a first vehicle, a presence of a second vehicle;
   measuring a level of ambient light, and determining the level of ambient light is below a threshold level;
   determining an operational status of a specific type of functioning exterior lighting of the second vehicle including detecting a light color, angle, and light intensity to identify a type of the exterior lighting; and
   alerting a driver of the second vehicle using a vehicle-to-vehicle communication signal, the signal including a notification related to the operational status of the exterior lighting of the second vehicle and suggesting usage of exterior lighting different from the specific type identified.

2. The method according to claim 1, further comprising identifying a direction of travel of the second vehicle with respect to the first vehicle.

3. The method according to claim 1, further comprising identifying the second vehicle as an oncoming vehicle moving in a direction towards the first vehicle,
   wherein determining the operational status of the exterior lighting results in a determination that headlights are not operating, and the signal includes a notification suggesting usage of headlights operated in a low beam mode.

4. The method according to claim 1, further comprising identifying the second vehicle as an oncoming vehicle moving in a direction towards the first vehicle,
   wherein determining the operational status of the exterior lighting results in a determination that headlights are operating in a high beam mode, and the signal includes a notification suggesting usage of the headlights in a low beam mode.

5. The method according to claim 4, wherein, upon the first vehicle passing the second vehicle, the method further comprises sending a follow-up vehicle-to-vehicle communication signal to the second vehicle, the follow-up signal including a notification suggesting that usage of the headlights can safely revert back to the high beam mode.

6. The method according to claim 1, further comprising identifying the second vehicle as an oncoming vehicle moving in a direction towards the first vehicle,
   wherein determining the operational status of the exterior lighting results in a determination that only parking lights are operating, and the signal includes a notification suggesting usage of headlights operated in a low beam mode.

7. The method according to claim 1, further comprising identifying the second vehicle as a stationary vehicle; and
   determining the second vehicle is parked or temporarily standing adjacent an intended travel path of the first vehicle,
   wherein determining the operational status of the exterior lighting results in a determination that the exterior lighting is off, and the signal includes a notification suggesting usage of parking lights or hazard lights.

8. The method according to claim 7, further comprising alerting a driver of the first vehicle to the presence and location of the second vehicle.

9. The method according to claim 1, further comprising monitoring for a presence of precipitation.

10. The method according to claim 9, further comprising detecting a presence of precipitation,
    wherein determining the operational status of the exterior lighting results in a determination that headlights are not operating, and the signal includes a notification suggesting usage of headlights operated in a low beam mode.

11. The method according to claim 1, wherein at least one of the first vehicle and the second vehicle is an autonomous vehicle.

12. A method for alerting a vehicle driver of an unsafe exterior lighting operational status, the method comprising:
    receiving and processing, at a first vehicle, information sufficient to detect a presence of a second vehicle;
    identifying a direction of travel of the second vehicle with respect to the first vehicle;
    measuring a level of ambient light, and determining the level of ambient light is below a threshold level;
    identifying a specific type of functioning exterior lighting of the second vehicle by detecting a light color, light angle, and light intensity; and
    alerting a driver of the second vehicle using a vehicle-to-vehicle communication signal, the signal including a notification suggesting usage of exterior lighting different from the specific type identified.

13. A non-transitory computer-readable medium having instructions embodied thereon that, when executed by a processor, perform operations in a first vehicle, the operations comprising:
    detecting a presence of a second vehicle;
    measuring a level of ambient light, and determining the level of ambient light is below a threshold level;
    determining an operational status of a specific type of functioning exterior lighting of the second vehicle, including detecting a light color, light angle, and light intensity to identify a type of the exterior lighting; and
    alerting a driver of the second vehicle using a vehicle-to-vehicle communication signal, the signal including a notification related to the operational status of the exterior lighting of the second vehicle, and suggesting usage of exterior lighting different from the specific type identified.

14. The non-transitory computer-readable medium as recited in claim 13, wherein the operations further comprise:
    identifying a direction of travel of the second vehicle with respect to the first vehicle.

15. The non-transitory computer-readable medium as recited in claim 14, wherein the operations further comprise:
    identifying the second vehicle as a stationary vehicle and determining the second vehicle is parked or temporarily standing adjacent an intended travel path of the first vehicle; and
    alerting a driver of the first vehicle of the presence of the second vehicle,
    wherein determining the operational status of the exterior lighting results in a determination that the exterior lighting is off, and the signal includes a notification suggesting usage of parking lights or hazard lights.

16. The non-transitory computer-readable medium as recited in claim 14, wherein the operations further comprise:
    identifying the second vehicle as an oncoming vehicle moving in a direction towards the first vehicle,
    wherein determining the operational status of the exterior lighting results in a determination that headlights are operating in a high beam mode, and the signal includes a notification suggesting the headlights be operated in a low beam mode.

17. The non-transitory computer-readable medium as recited in claim 14, wherein the operations further comprise:
    identifying the second vehicle as an oncoming vehicle moving in a direction towards the first vehicle,
    wherein determining the operational status of the exterior lighting results in a determination that only parking lights are operating, and the signal includes a notification suggesting usage of headlights operated in a low beam mode.

18. The non-transitory computer-readable medium as recited in claim 14, wherein the operations further comprise:
    identifying the second vehicle as an oncoming vehicle moving in a direction towards the first vehicle,
    wherein determining the operational status of the exterior lighting results in a determination that headlights are not operating, and the signal includes a notification suggesting usage of headlights operated in a low beam mode.

* * * * *